US012585162B2

(12) United States Patent
Johansson et al.

(10) Patent No.: US 12,585,162 B2
(45) Date of Patent: Mar. 24, 2026

(54) DISPLAYING IMAGES ON TOTAL INTERNAL REFLECTIVE DISPLAYS

(71) Applicant: WUXI CLEARINK LIMITED, Wuxi (CN)

(72) Inventors: Thomas Johansson, Coquitlam (CA); Vivek Porush, Milpitas, CA (US); Graham Beales, Vancouver (CA); Peter T. Kazlas, Sudbury, MA (US)

(73) Assignee: WUXI CLEARINK LIMITED, Wuxi (CN)

( * ) Notice: Subject to any disclaimer, the term of this patent is extended or adjusted under 35 U.S.C. 154(b) by 297 days.

(21) Appl. No.: 18/223,011

(22) Filed: Jul. 17, 2023

(65) Prior Publication Data

US 2023/0359101 A1    Nov. 9, 2023

Related U.S. Application Data

(62) Division of application No. 16/616,352, filed as application No. PCT/US2018/034212 on May 23, 2018, now Pat. No. 11,709,412.

(60) Provisional application No. 62/510,272, filed on May 24, 2017.

(51) Int. Cl.
| | |
|---|---|
| *G02F 1/315* | (2006.01) |
| *G02F 1/1681* | (2019.01) |
| *G02F 1/19* | (2019.01) |

(52) U.S. Cl.
CPC ............ *G02F 1/315* (2013.01); *G02F 1/1681* (2019.01); *G02F 1/195* (2013.01)

(58) Field of Classification Search
CPC ......... G02F 1/315; G02F 1/1681; G02F 1/195
See application file for complete search history.

(56) References Cited

U.S. PATENT DOCUMENTS

| | | | |
|---|---|---|---|
| 9,495,918 | B2 | 11/2016 | Harrington et al. |
| 2004/0177237 | A1 | 9/2004 | Juppenthal et al. |
| 2005/0068287 | A1 | 3/2005 | Lin et al. |
| 2007/0057906 | A1 | 3/2007 | Johnson et al. |
| 2009/0096745 | A1 | 4/2009 | Sprague et al. |
| 2010/0245375 | A1 | 9/2010 | Rhodes |

(Continued)

FOREIGN PATENT DOCUMENTS

| | | |
|---|---|---|
| CN | 1469308 A | 1/2004 |
| CN | 105190740 A | 12/2015 |

(Continued)

OTHER PUBLICATIONS

International Search Report in Application No. PCT/US2018/034212 Dated Sep. 25, 2018.

(Continued)

*Primary Examiner* — Sahlu Okebato
(74) *Attorney, Agent, or Firm* — Maschoff Brennan

(57) ABSTRACT

A total internal reflection-based display may be driven by an apparatus and method to move electrophoretically mobile particles into and out of an evanescent wave region to create static and video images. The apparatus may comprise one or more of a host microprocessor/controller, display controller, TIR display panel, frame buffer memory 1, frame buffer memory 2, host interface, temperature/environmental sensor, timing controller, look up table, power management integrated circuit or display panel interface.

20 Claims, 3 Drawing Sheets

(56)　　　　　　References Cited

U.S. PATENT DOCUMENTS

| 2013/0107164 A1* | 5/2013 | Verslegers | G02B 6/0065 |
| | | | 349/61 |
| 2014/0268303 A1 | 9/2014 | Uysal et al. | |
| 2014/0292830 A1* | 10/2014 | Harrington | G09G 3/2044 |
| | | | 345/208 |
| 2016/0155399 A1 | 6/2016 | Tripathi et al. | |
| 2016/0246155 A1* | 8/2016 | Loxley | G02F 1/195 |
| 2017/0075184 A1 | 3/2017 | Low et al. | |
| 2018/0286319 A1* | 10/2018 | Emelie | G09G 3/344 |

FOREIGN PATENT DOCUMENTS

| CN | 106660003 A | 5/2017 |
| EP | 1 369 845 A2 | 12/2003 |

OTHER PUBLICATIONS

CN Office Action dated Jul. 29, 2023 as received in Application No. 201880034293.1.

* cited by examiner

DISPLAYING IMAGES ON TOTAL INTERNAL REFLECTIVE DISPLAYS

RELATED APPLICATIONS

The instant specification claims priority to the U.S. Provisional Application Ser. No. 62/510,272 (filed May 24, 2017). The instant application also claim priority to application Ser. No. 15/143,708 (filed May 2, 2016), which is a Continuation-In-Part ("CIP") of application Ser. No. 14/903, 547 (filed Feb. 5, 2016) which claimed priority to PCT Application Serial No. WO2015/005899A2 (filed Jul. 8, 2013). The specification of each of the foregoing applications is incorporated herein in its entirety.

FIELD

The disclosed embodiments generally relate to total internal reflection (TIR) in high brightness, wide viewing angle image displays. In one embodiment, the disclosure relates to an apparatus for driving static and video images in TIR-based image displays.

BACKGROUND

Conventional total internal reflection (TIR) based displays include, among others, a transparent high refractive index front sheet in contact with a low refractive index fluid. The front sheet and fluid may have different refractive indices that may be characterized by a critical angle $\theta_c$. The critical angle characterizes the interface between the surface of the transparent front sheet (with refractive index $\eta_1$) and the low refractive index fluid (with refractive index $173$). Light rays incident upon the interface at angles less than $\theta_c$ may be transmitted through the interface. Light rays incident upon the interface at angles greater than $\theta_c$ may undergo TIR at the interface. A small critical angle (e.g., less than about 50°) is preferred at the TIR interface since this affords a large range of angles over which TIR may occur. It may be prudent to have a fluid medium with preferably as small a refractive index ($\eta_3$) as possible and to have a transparent front sheet composed of a material having a refractive index ($\eta_1$) preferably as large as possible. The critical angle, $\theta_c$, is calculated by the following equation (Eq. 1):

$$\theta_c = \sin^{-1}\left(\frac{\eta_3}{\eta_1}\right) \tag{1}$$

Conventional TIR-based reflective image displays further include electrophoretically mobile, light absorbing particles. The electrophoretically mobile particles move in response to a bias between two opposing electrodes. When particles are moved by a voltage bias source to the surface of the front sheet they may enter the evanescent wave region (depth of up to about 1 micron) and frustrate TIR. The evanescent wave region depth may vary due to such variables as the wavelength of the incident light, the angle of the incident light and the refractive indices of the front sheet and the medium. Incident light may be absorbed by the electrophoretically mobile particles to create a dark, grey or colored state observed by the viewer. The states may be dependent on the number of particles and their location within the evanescent wave region. The dark or colored state may be the color of the particles or a color filter. Under such conditions, the display surface may appear dark or black to the viewer. When the particles are moved out of the evanescent wave region (e.g., by reverse biasing), light may be reflected by TIR. This creates a white, bright or grey state that may be observed by the viewer. An array of pixelated electrodes may be used to drive the particles into and out of the evanescent wave region at individual pixels to form combinations of white and colored states, such as near the surface of a color filter. The combinations of white and colored states may be used to create images or to convey information to the viewer.

The front sheet in conventional TIR-based displays typically includes a plurality of higher refractive index close-packed convex structures on the inward side facing the lower refractive index medium and electrophoretically mobile particles (i.e., the surface of the front sheet which faces away from the viewer). The convex structures may be hemispherically-shaped but other shapes may be used. A conventional TIR-based display 100 is illustrated in FIG. 1A. Display 100 is shown with a transparent front sheet 102 with outer surface 104 facing viewer 106. Display 100 further comprising a layer of a plurality 108 of hemispherically-shaped protrusions 110, rear support sheet 112, transparent front electrode 114 on the surface of the plurality of individual hemispherically-shaped protrusions 110 and rear electrode 116. Rear electrode 116 may comprise a passive matrix array of electrodes, a thin film transistor (TFT) array or a direct drive array of electrodes. The rear array of electrodes may be formed in an array of pixels wherein each pixel may be driven by a TFT. FIG. 1A also shows low refractive index fluid 118 which is disposed within the cavity or gap 120 formed between the surface of protrusions 108 and rear support sheet 112. Fluid 118 contains a plurality of light absorbing electrophoretically mobile particles 122. Display 100 may further include a voltage source 124 capable of creating a bias across cavity 120. Display 100 may further comprise one or more dielectric layers 126, 128 on front electrode 114 or rear electrode 116 or on both the front and rear electrodes, and a color filter layer 130. When particles 122 are electrophoretically moved towards front electrode 114 and into the evanescent wave region, they may frustrate TIR. This is shown to the right of dotted line 132 and is illustrated by incident light rays 134 and 136 being absorbed by particles 122. This area of the display, such as at a pixel, may appear as a dark, colored or grey state to viewer 106.

When particles are moved away from front sheet 102 and out of the evanescent wave region towards rear electrode 116 (as shown to the left of dotted line 132) incident light rays may be totally internally reflected at the interface of the surface of electrode 126 on convex protrusion array 108 and medium 118. This is represented by incident light ray 138, which is totally internally reflected and exits the display towards viewer 106 as reflected light ray 140. The display pixel may appear white, bright or grey to the viewer.

Conventional TIR-based display 100 may further comprise cross-walls 142 that bridge front sheet 102 to rear sheet 112. Cross-walls may comprise at least one dielectric layer 144. Display 100 may further comprise a directional front light system 146. Front light system 146 may comprise light source 148 and waveguide 150. Display 100 may further comprise an ambient light sensor (ALS) 152 and front light controller 154.

FIG. 1B schematically illustrates a cross-section of a portion of a conventional TIR-based display showing the approximate location of the evanescent wave region. Drawing 180 in FIG. 1B is a close-up view of a portion of drawing 100 in FIG. 1A. The evanescent wave region is located at the interface of higher refractive index protrusions 110 and lower refractive index medium 118. This location is illustrated in drawing 180, the evanescent wave region 182 is located between dotted line 184 and top layer 126. The evanescent wave is typically conformal to the surface of layer of protrusions 108. The depth of the evanescent wave region is about 1 micron, as previously mentioned.

Optical states in TIR-based image displays may be modulated by movement of electrophoretically mobile particles into and out of the evanescent wave region at the interface of a high refractive index convex protrusions and a low refractive index medium. The movement of the particles may be controlled by an apparatus for driving static and video images in TIR-based reflective image displays.

BRIEF DESCRIPTION OF DRAWINGS

These and other embodiments of the disclosure will be discussed with reference to the following exemplary and non-limiting illustrations, in which like elements are numbered similarly, and where.

DETAILED DESCRIPTION

Throughout the following description specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive or exclusive, sense.

This disclosure generally relates to a TIR-based reflective image display. According to certain embodiments of the disclosure, a TIR-based reflective image display may be driven by an apparatus and method to create one or more of static and/or video images. This may apparatus may include one or more of a host microprocessor, look-up table (LUT), power management integrated circuit (PMIC) or display controller. In some embodiments, the apparatus may further include one or more of a timing controller (TCON), on or off-chip memory such as dynamic random-access memory (DRAM), secure digital (SD) card, light sensor, temperature sensor or an environmental sensor.

Figure 1A:
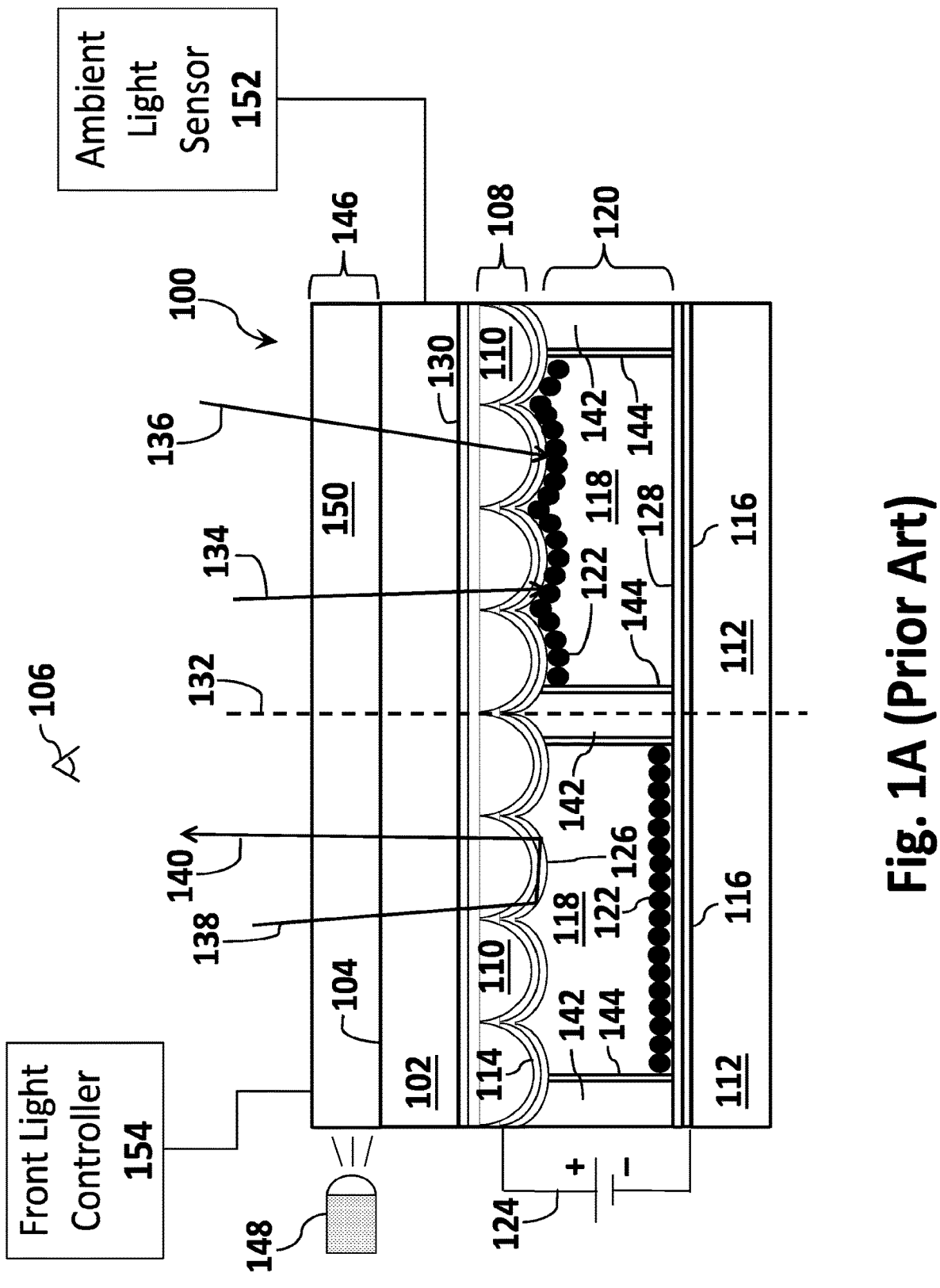
FIG. 1A schematically illustrates a cross-section of a portion of a conventional TIR-based display.
Figure 1B:
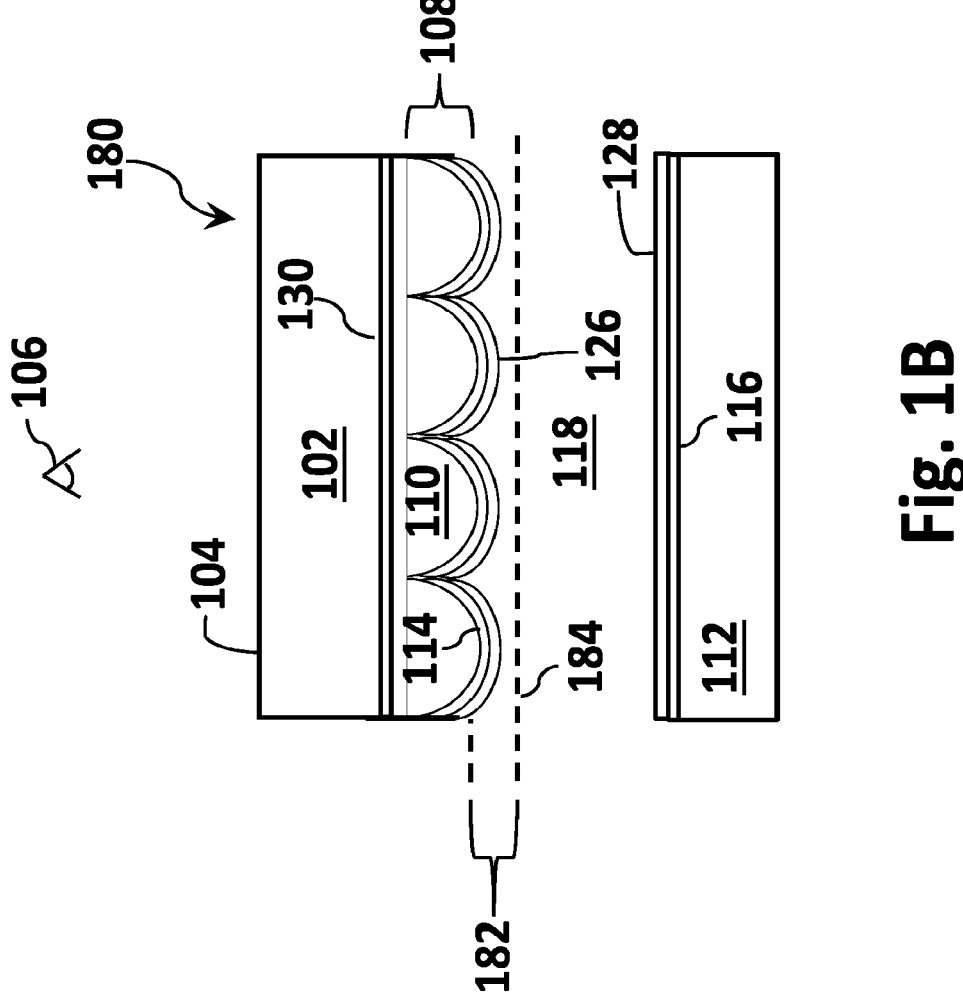
FIG. 1B schematically illustrates a cross-section of a portion of a conventional TIR-based display showing the approximate location of the evanescent wave region.
Figure 2:
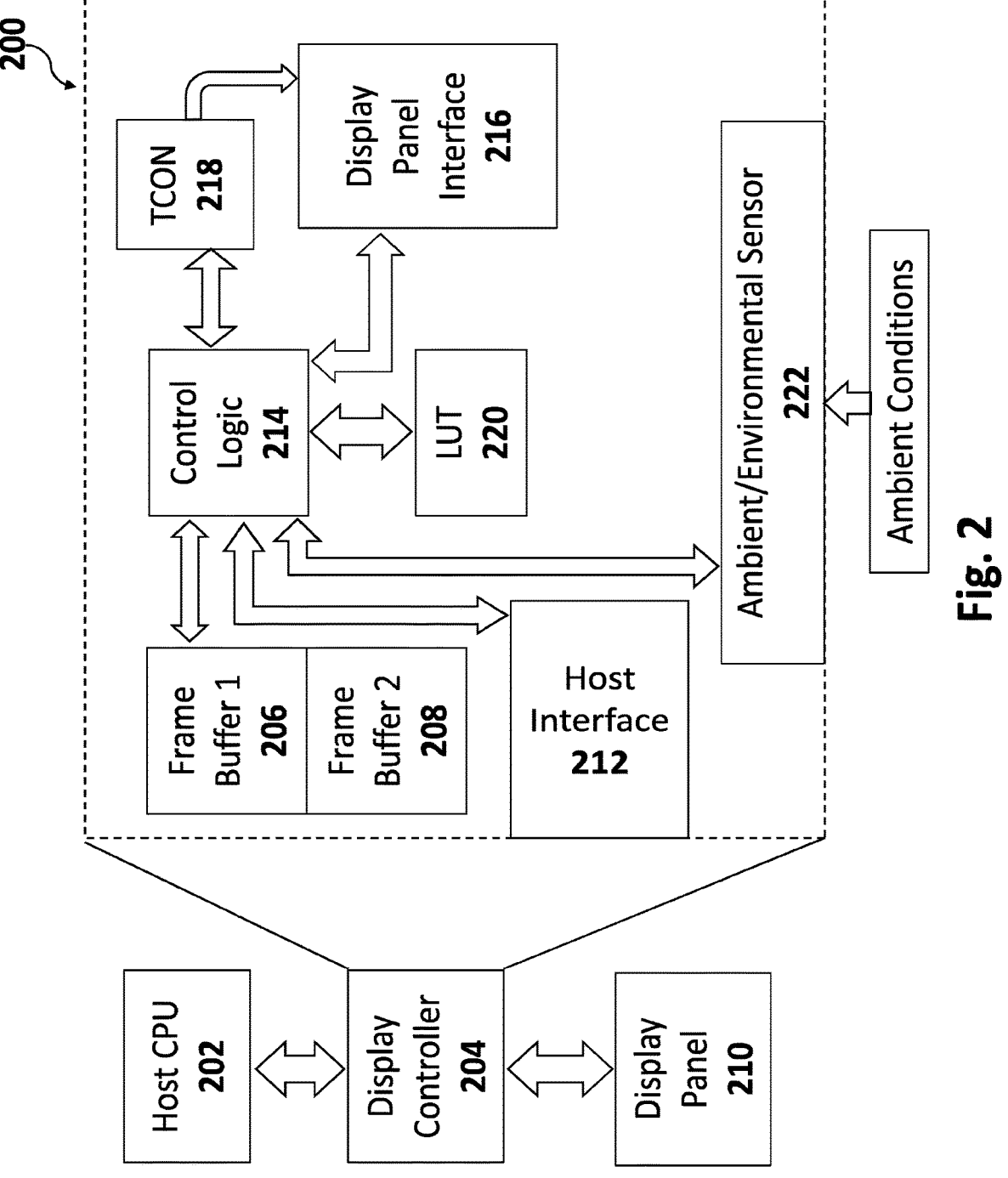
FIG. 2 schematically illustrates one embodiment of an apparatus for driving static and video images for TIR-based reflective image displays.

FIG. 2 schematically illustrates one embodiment of an apparatus for driving static and video images for TIR-based reflective image displays. TIR-based reflective image displays are displays where the totally internally reflected light may be modulated. Modulation of the light may be carried out by frustration of totally internally reflected light. In an exemplary embodiment, this may be completed by moving electrophoretically mobile light absorbing particles into and out of the evanescent wave region. In some embodiments, this may be completed by a microelectromechanical system (MEMS). In other embodiments, this may be completed by an electrowetting system. An electrowetting system may comprise a polar light absorbing colored fluid in a non-polar transparent fluid. Frustration of TIR may be carried out by moving a polar light absorbing colored fluid into the evanescent wave region. Conversely, reflection (or degree of reflection) can be modulated by moving the polar light absorbing colored fluid out of the evanescent wave region.

In some embodiments, an apparatus to drive static and video images for TIR-based reflective image displays may comprise a display unit that supports processing of static images and video data, driving voltages and waveforms. The waveforms may comprise various driving voltages and durations of time at which the voltages are applied.

The display unit 200 may comprise a host microprocessor/controller 202. The host microprocessor/controller 202 may process image/video data from a native format to a suitable format for the display controller unit 204. The host microprocessor/controller 202 may be interfaced (not shown) to an off-chip memory such as SD-card, DRAM or any other memory devices containing image/video data (not shown). Depending on the size of the content (image/video) it could be stored internally in the Host/CPU (interchangeably, processor/controller) 202.

Processor/controller 204 may comprise hardware, software or a combination of hardware and software (e.g., firmware). In certain embodiments, display controller 204 may be integrated with CPU 202 (e.g., on the same die). Image/video data may also be generated by an application running on top of host CPU 202 such as text editor/viewer, web browser or any other operating system application. Host processor/controller 202 may support display resolution at a given color depth or grey scale (i.e., 1, 2, 4, 8, 16, 24, 32 bits per pixel (bpp)). For example, a 768×1024 resolution image/video data of a given grey/color depth should be processed by host processor/controller 202 and/or display controller 204 to provide constant updates to the display at a given frame rate.

In some embodiments, the requirements of frame rate for driving a static image may be about one image (frame) per second. In other embodiments, a user defined frame rate may be used that may depend on the host application running on the processor/controller 202. In such a case, a host processor/controller 202 and/or display controller 204 may be able to process the image data at a required frame rate at a given resolution as designated by external factors (e.g., user or input data from external sensors). Frame rate(s) required for video data are much higher as compared to static images. The host processor/controller 202 and/or display controller 204 may be able to process at least 22-24 frames per second to support a video rate TIR-based EPD display.

In some embodiments, processor/controller 202 may implement a frame buffer memory that is a read-write memory allocated for the storage of supplied image/video data. For example, Frame buffer 1 (206) may store the data of the current frame while Frame buffer 2 (208), may store the data for the previous frame and/or the next frame to be updated. Each Frame buffer may comprise hardware, software or a combination of hardware and software. The size of the frame buffer memory may be dependent on several factors and may be obtained as follows: (a) resolution of the display panel 210, and (b) grey levels/color depth of a given image/video. For example, if display panel 210 has a resolution of 768×1024 pixels and grey/color depth of 2 (monotonic) then the minimum size of frame buffer would be 768×1024×1 bits as a single bit can support two grey levels (i.e., "On(G0)" & "OFF(G1)").

Additional waveforms may be included to compensate for environmental factors. For a grey/color depth of 4, the frame size would be increased to 768×1024×2 bits resulting in storage of data for 4 grey levels for each pixel (i.e. G0, G2, G3, G1). Depending on the desired frequency of update, grey/color depth levels and the size of frame buffer memory may be adjusted and additional frame buffer(s) may be implemented within a host/display controller controlled memory. Frame buffer memory size may also be dependent on the type of update performed on the display panel. For instance, if the update on the display panel 210 is performed in increments of "p" pixels then the frame buffer memory size may be adjusted to "pxq" bits where "p" is the number of pixels and "q" is the grey/color depth. This type of update could be utilized for static and partial image updates. Frame buffer memory may also keep track of current and next images over various time scales to apply appropriate LUT waveforms. In some embodiments, the frame buffer memory may keep track of image states over the period of 1 s, 10 s, 100 s, 1000 s or longer. Processor/controller 202 may transfer this frame buffer data to display controller 204 where appropriate waveforms for update on the display panel can be applied. Optionally, processor/controller 202 may pre-process images/video and store differences between current and next frame to be utilized by the display controller 204 to perform waveform updates. Waveforms may be altered depending on multiple factors such as environment, image history, etc.

Host CPU 202 may offload aforementioned tasks to display controller 204. In such an embodiment, host CPU 202 may provide an interface 212 to the display controller to access data memory and perform required processing on the image/video data along with the task of updating the display panel. For example, host CPU 202 may place the desired image/video content at a specified memory address accessible to display controller 204 to read and process this data through various display update waveforms using LUTs before performing a display update.

Display controller 204 may comprise control logic 214. Control logic 214 may handle communication between and provide logic required to interface TCON 218 with frame buffer 206 and interface TCON 218 with LUT 220. Typically, control logic 214 may be part of display controller IC 204. In some embodiments, control logic 214 may be a separate IC.

Display controller 204 may comprise a display panel interface 216. Display panel interface 216 interfaces the display electronics with display panel 210. Display panel interface 216 may comprise hardware in order for the display electronics to communicate with display panel 210.

Display controller 204 may comprise a timing controller (TCON) 218. TCON 218 may control timing between source and gate source driver ICs. TCON logic may be in an IC as circuitry. In some embodiments, TCON 218 may be a field-programmable gate array (FPGA). In some embodiments, TCON 218 may be implemented in software. TCON (218) may receive image data from host CPU (202) and convert signals to control timing of the display.

Processing required by host CPU 202 and/or display controller 204 to perform an update from current to next frame may include one or more of the following: (a) frame rate and timing control for static and video updates, (b) display update procedures for partial updates, full updates off frame buffer and rendering pixel data, (c) interface to a driver IC or a discrete circuitry to generate and control drive voltages on the display panel 210 according to the selected waveform, (d) ambient sensor or interface to such IC used to determine current environmental conditions, such as temperature, to adapt waveform updates, (e) host, memory and display panel communication interfaces, (f) various color processing algorithms to process image/video data according to the display's color filter arrays (CFAs) and/or pixel layout.

In some embodiments, a system with high resolution may utilize a host processor/controller 202 and/or display controller 204 to perform final display updates. Such a system may utilize "Gate" and "Source" driver integrated circuits (IC(s)) which may be placed on or attached to the display panel to interface with the metallic or ITO traces from gate and source lines of the active-matrix thin film transistor (TFT). In such an apparatus, display controller 204 provides an interface to these driver ICs on display panel 210.

In some embodiments, a display unit 200 may utilize an integrated display controller IC to drive lower resolution displays. Such integrated display controller ICs may be placed as chip on glass (COG) or as chip on flex (COF) instead of being placed on a printed circuit board (PCB). These IC's may be designed as custom ASIC to support a given display resolution within a certain frame rate and voltage range. However, their functionality may closely resemble the functions described above with the display controller.

For example an integrated display controller with a frame buffer size of 240×320 may support a maximum display resolution of 240×320 pixels and smaller resolution. Integrated display controller IC(s) may offer benefits in small resolution displays and wearable applications by off-loading most of the display update tasks from the host processor resulting in power savings. In such a system the host processor may provide an interface to the slave integrated display controller IC(s) which in turn may store the frame buffer, waveform LUTs 220 and generates all the required voltages and timing for a given display update. Display unit 200 may further comprise one or more of an ambient or environmental sensor 222. Data from sensor 222 may be used to determine which waveform may be needed to be applied to change from current frame to the next frame.

A TIR-based reflective image display may be driven to create static images and video rate data by moving electrophoretically mobile particles into and out of an evanescent wave region by one embodiment of a method. The method may comprise:

1) The host processor/controller generates a request to fetch the required data from an on-chip or off-chip memory location. In case of a display controller the host processor updates the display controller by providing a memory or address pointer that may point to the first location of the requested data and then passing the control of memory bus to the display controller. All subsequent fetches to the data may be done by incrementing the pointer internally on the display controller;

2) Image/video frame data may be converted from its native format to a raw binary format. Native format of the data may have information about the nature of the frame data (i. e. frame type—static/video, mono/grey/color depth, resolution, maximum grey levels, compression type, frame rate, etc). This metadata may be used by the host processor/controller 202 or display controller 204 to convert the frame in a suitable format which may contain all of the information to update the display panel through selected LUT 220.

3) Updating the display panel frame may first requires one or more of the host processor or display controller to compare two sets of frame buffer memories: current frame to be displayed and previous frame. The data of current frame is stored in frame buffer memory 1 206 where it could be used to perform refreshes to the current frame based on a selected waveform. Data from a new frame may be stored in frame buffer memory 2 208 and may be used to update the display panel to the next frame. The host processor or display controller may perform a real time comparison of the previous frame currently displayed with the new frame (new update to display) and determine the changes that may be required to change from the current frame to a new frame. This may lead to no change in a pixel's optical state or a change in a pixel's optical state from grey/color level "Gn" to "Gm". This may further lead to derivation of waveform transactions required for each pixel to change from current image to next image;

4) Environmental conditions may be determined by the host processor/controller 202 or display controller 204 through ambient senor 222 to assist in the selection of a correct waveform according to current environmental conditions. Based on the result from 3), the host processor/controller or display controller may select an appropriate waveform from previously designed waveforms stored in the LUT 220. The LUT 220 may be stored in host processor/controller 202 and/or display controller 204 or on an external memory. A host processor/controller with access to the LUT 220 can then select the appropriate waveform for rendering an update to the display;

5) If a display controller 204 is present in an embodiment of the system, it may send the final image/video frame update data to the display panel and may utilize PMIC or a discrete circuit to generate the required voltage according to the selected waveform; and 6) The final update on the display panel may be performed frame by frame according to the selected waveform in LUT with precise timing controlled by TCON 218.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane.

In the exemplary display embodiments described herein, they may be used in IoT and non-IoT applications such as in, but not limited to, electronic book readers, portable computers, tablet computers, cellular telephones, smart cards, signs, watches, wearables, military display applications, automotive displays, automotive license plates, shelf labels, flash drives and outdoor billboards or outdoor signs comprising a display. The displays may be powered by one or more of a battery, solar cell, wind, electrical generator, electrical outlet, AC power, DC power or other means.

The following relate to exemplary and non-limiting embodiments which may be implemented according to the disclosed principles. Example 1 relates to a Total Internal Reflective (TIR) display configured for static and dynamic data display, the display comprising: a host processor to process image data from a native format to a TIR-suitable format; a display controller in communication with the host processor, the display controller configured to receive the processed image data from the host processor, the display controller further comprising: a first frame buffer to store data for a current frame, a second frame buffer to store data for at least one of a previous or a subsequent frame, a control logic, and a look up table (LUT) to store a plurality of waveform corresponding to each of a plurality of image display requirements; a display panel having an opposing electrode pair and a plurality of electrophoretically mobile particles disposed in a medium bound by the opposition electrode pair, the plurality of electrophoretically mobile particles configured to move proximal to one of the electrodes in the electrode pair to at least one of totally internally reflect an incoming ray of light or to frustrate the incoming ray of light; wherein the display controller is configured to apply at least one waveform to display one of a static or dynamic image. The embodiments of example 1 may be implemented in software, hardware or a combination of software and hardware (e.g., firmware).

Example 2 relates to the TIR display of example 1, wherein the display controller is configured to apply a first voltage bias to the plurality of electrophoretically mobile particles to thereby move at least one of the plurality of electrophoretically mobile particles proximal to a first electrode of the opposing electrode pair to thereby frustrate TIR.

Example 3 relates to the TIR display of example 1, wherein the display controller is configured to apply a second voltage bias to the plurality of electrophoretically mobile particles to thereby move at least one of the plurality of electrophoretically mobile particles proximal to a second electrode of the opposing electrode pair to thereby frustrate TIR.

Example 4 relates to the TIR display of example A, further comprising an ambient sensor to communicate with the control logic to provide data for selecting select a waveform to change from a current frame to a subsequent frame.

Example 5 relates to the TIR display of example 1, wherein one or more of the host processor and the display controller are further configured to: (a) control and update frame rate and display timing, (b) display update procedures for partial updates, full updates of frame buffer and rendering pixel data, (c) interface to a driver integrated circuitry (IC) or a discrete circuitry to generate and control a drive voltage on the display panel, (d) interface an ambient sensor to determine an environmental condition and to adapt waveform updates, and (0 process algorithms to display color image and/or video data to accommodate a color filter arrays (CFAs) of the display.

Example 6 relates to the TIR display of example 1, an integrated display controller circuitry to drive a lower display resolution.

Example 7 relates to the TIR display of example 1, wherein at least one of the host processor or the display controller is configured to compare a current frame and a subsequent frame to update the display panel with a refresh waveform prior to displaying the subsequent frame and wherein the current frame is stored in the first frame buffer and the subsequent frame is stored at the second frame buffer.

Example 8 relates to the TIR display of example 1, wherein the refresh waveform is different from a waveform used to display the current frame.

Example 9 relates to the TIR display of example 1, wherein the host processor and the display controller are configured on a semiconductor die.

Example 10 relates to a method to display an image on a Total Internal Reflective (TIR) display, the method comprising: processing native image data to provide processed image data; storing a first portion of the processed image data at a first memory location and storing a second portion of the processed image data at a second memory location; receiving a first ambient signal, the first ambient signal representing an ambient display condition at a first time frame; selecting a first waveform and a first voltage to display the first portion of the processed image data as a function of the first ambient signal; receiving a second ambient signal, the second ambient signal representing an ambient display condition at a second time frame; and selecting a second waveform and a second voltage to display the second portion of the processed image data as a function of the second ambient signal; applying the second waveform and the second voltage to at least one of a first and second electrodes to move a plurality of electrophoretically mobile particles from the first electrode to the second electrode to absorb an incoming ray of light at an evanescent wave region formed proximal to the second electrode to thereby provide a dark state display.

Example 11 relates to the method of example 11, wherein the ambient display condition represented one of ambient light or ambient temperature.

Example 12 relates to the method of example 11, wherein the second portion of the processed image data represents an image to be displayed by the TIR display after displaying image data represented by the first portion of the processed image data.

Example 13 relates to the method of example 11, wherein the mobile particles are disposed in a medium.

Example 14 relates to the method of example 11, wherein at least one of the second waveform or the second voltage is configured to move a plurality of electrophoretically mobile particles from a first electrode to a second electrode to absorb an incoming ray of light at an evanescent wave region proximal to the second electrode to thereby substantially prevent TIR.

Example 15 relates to the method of example 11, wherein the evanescent wave region is formed at the second electrode proximal to the surface of the display.

Example 16 relates to the method of example 11, further comprising applying the first waveform and the first voltage to at least one of the first and second electrodes to move the plurality of electrophoretically mobile particles from the second electrode to the first electrode to substantially reflect an incoming light ray to thereby provide TIR.

While the principles of the disclosure have been illustrated in relation to the exemplary embodiments shown herein, the principles of the disclosure are not limited thereto and include any modification, variation or permutation thereof.

The invention claimed is:

1. A method to display an image on a Total Internal Reflective (TIR) display, the method comprising:
processing native image data to provide processed image data;

storing a first portion of the processed image data at a first memory location and storing a second portion of the processed image data at a second memory location;
receiving a first ambient signal, the first ambient signal representing an ambient display condition at a first time frame;
selecting a first waveform and a first voltage to display the first portion of the processed image data as a function of the first ambient signal;
receiving a second ambient signal, the second ambient signal representing an ambient display condition at a second time frame;
selecting a second waveform and a second voltage to display the second portion of the processed image data as a function of the second ambient signal; and
applying the second waveform and the second voltage to at least one of a first and second electrodes to move a plurality of electrophoretically mobile particles from the first electrode to the second electrode to absorb an incoming ray of light at an evanescent wave region formed proximal to the second electrode to thereby provide a dark state of the TIR display at the second electrode.

2. The method of claim 1, wherein the ambient display condition represents one of ambient light or ambient temperature.

3. The method of claim 1, wherein the second portion of the processed image data represents an image to be displayed by the TIR display after displaying image data represented by the first portion of the processed image data.

4. The method of claim 1, wherein the mobile particles are disposed in a medium.

5. The method of claim 1, wherein the dark state of the TIR display is one in which TIR is substantially prevented for the TIR display at the second electrode.

6. The method of claim 1, wherein the evanescent wave region is formed at the second electrode proximal to the surface of the display.

7. The method of claim 1, further comprising applying the first waveform and the first voltage to at least one of the first and second electrodes to move the plurality of electrophoretically mobile particles from the second electrode to the first electrode to substantially reflect an incoming light ray to thereby provide TIR.

8. One or more non-transitory computer-readable media containing instructions that, when executed by one or more processors, causes a system that includes a Total Internal Reflective (TIR) display to perform one or more operations, the operations comprising:
processing native image data to provide processed image data;
storing a first portion of the processed image data at a first memory location and storing a second portion of the processed image data at a second memory location;
receiving a first ambient signal, the first ambient signal representing an ambient display condition at a first time frame;
selecting a first waveform and a first voltage to display the first portion of the processed image data as a function of the first ambient signal;
receiving a second ambient signal, the second ambient signal representing an ambient display condition at a second time frame; and
selecting a second waveform and a second voltage to display the second portion of the processed image data as a function of the second ambient signal;

sending an instruction to apply the second waveform and the second voltage to at least one of a first and second electrodes to move a plurality of electrophoretically mobile particles from the first electrode to the second electrode to absorb an incoming ray of light at an evanescent wave region formed proximal to the second electrode to thereby provide a dark state of the TIR display at the second electrode.

9. The non-transitory computer-readable media of claim 8, wherein the ambient display condition represents one of ambient light or ambient temperature.

10. The non-transitory computer-readable media of claim 8, wherein the second portion of the processed image data represents an image to be displayed by the TIR display after displaying image data represented by the first portion of the processed image data.

11. The non-transitory computer-readable media of claim 8, wherein the mobile particles are disposed in a medium.

12. The non-transitory computer-readable media of claim 8, wherein the dark state of the TIR display is one in which TIR is substantially prevented for the TIR display at the second electrode.

13. The non-transitory computer-readable media of claim 8, wherein the evanescent wave region is formed at the second electrode proximal to the surface of the display.

14. The non-transitory computer-readable media of claim 8, wherein the operations further comprise sending a second instruction to apply the first waveform and the first voltage to at least one of the first and second electrodes to move the plurality of electrophoretically mobile particles from the second electrode to the first electrode to substantially reflect an incoming light ray to thereby provide TIR.

15. A system comprising:
a Total Internal Reflective (TIR) display;
one or more processors;
one or more non-transitory computer-readable media containing instructions that, when executed by one or more processors, causes the system to perform one or more operations, the operations comprising:
processing native image data to provide processed image data;
storing a first portion of the processed image data at a first memory location and storing a second portion of the processed image data at a second memory location;

receiving a first ambient signal, the first ambient signal representing an ambient display condition at a first time frame;

selecting a first waveform and a first voltage to display the first portion of the processed image data as a function of the first ambient signal;

receiving a second ambient signal, the second ambient signal representing an ambient display condition at a second time frame; and selecting a second waveform and a second voltage to display the second portion of the processed image data as a function of the second ambient signal;

sending an instruction to apply the second waveform and the second voltage to at least one of a first and second electrodes to move a plurality of electrophoretically mobile particles from the first electrode to the second electrode to absorb an incoming ray of light at an evanescent wave region formed proximal to the second electrode to thereby provide a dark state of the TIR display at the second electrode.

16. The system of claim 15, wherein the ambient display condition represents one of ambient light or ambient temperature.

17. The system of claim 15, wherein the second portion of the processed image data represents an image to be displayed by the TIR display after displaying image data represented by the first portion of the processed image data.

18. The system of claim 15, wherein the dark state of the TIR display is one in which TIR is substantially prevented for the TIR display at the second electrode.

19. The system of claim 15, wherein the evanescent wave region is formed at the second electrode proximal to the surface of the display.

20. The system of claim 15, wherein the operations further comprise sending a second instruction to apply the first waveform and the first voltage to at least one of the first and second electrodes to move the plurality of electrophoretically mobile particles from the second electrode to the first electrode to substantially reflect an incoming light ray to thereby provide TIR.

* * * * *